(12) United States Patent
Stephens

(10) Patent No.: US 10,105,975 B2
(45) Date of Patent: Oct. 23, 2018

(54) SYSTEM AND METHOD FOR PRINTING SCRATCH-OFF LOTTERY TICKETS

(71) Applicant: Scientific Games International, Inc., Newark, DE (US)

(72) Inventor: Kenneth A. Stephens, Alpharetta, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 15/799,197

(22) Filed: Oct. 31, 2017

(65) Prior Publication Data

US 2018/0079237 A1 Mar. 22, 2018

Related U.S. Application Data

(63) Continuation of application No. 15/271,781, filed on Sep. 21, 2016, now Pat. No. 9,821,577.

(51) Int. Cl.
*B41J 15/04* (2006.01)
*B41J 3/54* (2006.01)
*B41J 2/01* (2006.01)

(52) U.S. Cl.
CPC ............ *B41J 15/04* (2013.01); *B41J 2/01* (2013.01); *B41J 3/543* (2013.01)

(58) Field of Classification Search
CPC ...... C09D 11/328; A63F 3/0655; A63F 3/066; A63F 3/00665; B41J 2/01; B41J 15/04; B41J 3/543
USPC ......................................... 283/100–103, 903
See application file for complete search history.

(56) References Cited

U.S. PATENT DOCUMENTS

| | | | |
|---|---|---|---|
| 5,681,065 A | 10/1997 | Rua, Jr. et al. |
| 6,554,410 B2 | 4/2003 | Jeanmaire et al. |
| 6,588,888 B2 | 7/2003 | Jeanmaire et al. |
| 6,863,385 B2 | 3/2005 | Jeanmarie et al. |
| 6,866,370 B2 | 3/2005 | Jeanmaire |
| 7,429,293 B2 | 9/2008 | Cai |
| 7,682,002 B2 | 3/2010 | Brost et al. |
| 7,766,471 B2 | 8/2010 | Kato et al. |
| 7,946,691 B2 | 5/2011 | Griffin et al. |
| 2004/0011248 A1 | 1/2004 | Taguchi et al. |
| 2004/0099182 A1 | 5/2004 | Kamoto et al. |
| 2005/0166794 A1 | 8/2005 | Bauer |
| 2006/0238588 A1 | 10/2006 | Lee et al. |

(Continued)

FOREIGN PATENT DOCUMENTS

WO WO 2007/082365 A1 7/2007

OTHER PUBLICATIONS

Extended EP Search Report, dated Feb. 15, 2018.

*Primary Examiner* — Huan Tran
*Assistant Examiner* — Alexander D Shenderov
(74) *Attorney, Agent, or Firm* — Dority & Manning, P.A.

(57) ABSTRACT

A method for producing scratch-off lottery tickets in a high speed printing line is provided, wherein the printing line includes one or more inkjet printing machines that print lottery tickets on a continuously running paper stock. One or more primer layers are applied to a surface of the paper stock in a defined game play area on each lottery ticket. With the inkjet printing machines game play indicia is printed over the primer layers in the game play area on each lottery ticket at a resolution of at least 600 dpi. The running paper stock is conveyed through the inkjet printing machines at a rate of at least 950 ft./min. The ink jet printing machines use a specially formulated dye-based ink.

14 Claims, 3 Drawing Sheets

(56) References Cited

U.S. PATENT DOCUMENTS

| | | |
|---|---|---|
| 2007/0043144 A1 | 2/2007 | House et al. |
| 2007/0164559 A1 | 7/2007 | Kozdras |
| 2007/0186812 A1 | 8/2007 | Koga et al. |
| 2007/0283845 A1 | 12/2007 | Mizusaki et al. |
| 2008/0171148 A1 | 7/2008 | Tonishi et al. |
| 2008/0207805 A1 | 8/2008 | Blease et al. |
| 2008/0280044 A1 | 11/2008 | Okamura et al. |
| 2009/0166968 A1 | 7/2009 | Stephens et al. |
| 2009/0169761 A1 | 7/2009 | Szajewski et al. |
| 2009/0169762 A1 | 7/2009 | Szajewski et al. |
| 2009/0202723 A1 | 8/2009 | Ikoshi et al. |
| 2013/0070031 A1 | 3/2013 | Nelson et al. |
| 2013/0072614 A1 | 3/2013 | Lindstrom |

SYSTEM AND METHOD FOR PRINTING SCRATCH-OFF LOTTERY TICKETS

PRIORITY CLAIM

The present application is a Continuation Application of U.S. application Ser. No. 15/271,781, filed Sep. 21, 2016.

BACKGROUND

Scratch-off lottery tickets (also referred to as "instant" lottery tickets) are well-known in the industry and have become a staple lottery product the world over. These tickets are typically mass produced in a high-speed production line that includes printing stations to provide the tickets with multi-colored and aesthetically pleasing graphics that are appealing to consumers.

Lottery jurisdictions and ticket manufacturers have strict security requirements with respect to scratch-off lottery tickets. The various ink layers and security layers printed onto the paper stock are engineered to prevent fraudulent attempts to discern the game data underlying the scratch-off coating layer or manipulate/alter the game data. The tickets are subjected to various testing protocols, such ultra-violet and infrared analysis, liquid chromatography, and microscopy and wet chemistry processes.

The security aspects must be balanced with the need to print the tickets at a relatively high rate and with the graphics and details that will appeal to consumers. In this regard, typical inkjet-based lottery ticket production lines run at a maximum rate of about 900 ft./min and at a resolution of about 240 dpi.

A limiting factor to increasing the throughput and resolution of these lines has been that the commercially available inks specifically formulated for these lines did not produce satisfactory tickets. For example, Eastman Kodak Company (Graphic Communications Group) of Dayton, Ohio, USA, offers a PROSPER S-series CMYK inkjet printing system having 600 dpi resolution capability and advertised production rates of up to 1,000 ft/min using specially formulated pigment-based dyes. However, the present Assignee/Applicant of this patent application found the PROSPER S-series system and associated inks not suitable for producing acceptable scratch-off lottery tickets at a 600 dpi resolution and at a press speed that was commercially feasible. The inks would not adequately dry at the desired press speeds, and would pick off of the tickets and track onto the processing rollers. The tickets routinely failed the wet chemistry security tests and were unusable.

Kodak offers a selection of dye based inks for the PROSPER S-series system formulated for high-speed (up to 3000 fpm) and high dpi (600×600). However, these inks are a low cost option for applications where water-fastness and permanence is of less importance, and are believed not suitable for the strict security requirements of scratch-off lottery tickets.

Also, at least by 2014, dye-based inks were advertised specifically for printing scratch-off lottery tickets. For example, Collins Inkjet of Cincinnati, Ohio, USA, offered a dye-based ink designed to print on scratch-off lottery tickets known as SUPERFAST Black (TWK-1961H). This ink was advertised as producing a high quality, scan-able image that dries well on coated and non-coated substrates and provides adequate decap time and little maintenance. Assignee/Applicant is not aware, however, of use of these dyes to successfully print scratch-off lottery tickets at a 600 dpi resolution at press speeds in excess of 950 ft./min.

The ability to print secure, high resolution scratch-off lottery tickets at significantly higher press speeds than are currently achieved would be a significant benefit to the lottery industry.

SUMMARY

Objects and advantages of the invention will be set forth in part in the following description, or may be obvious from the description, or may be learned through practice of the invention.

In accordance with aspects of the invention, a method is provided for producing scratch-off lottery tickets having game play indicia printed thereon at a resolution of at least 600 dpi and at a press speed of at least 950 ft./min.

The present inventors determined that high resolution (at least 600 dpi) of the game play indicia (and the ticket graphics if desired) and high speed (at least 950 ft./min) printing of secure scratch-off lottery tickets using conventional inkjet printing lines (e.g., the Kodak PROSPER S-series line) is achievable with particular modifications to the underlying primer layers and the print inks. Although pigment based inks were believed to be necessary for security and integrity of the ink layers, it has been determined that a unique combination of a paper stock primer and specially formulated dye-based inks is suitable.

The conventional inks (e.g., prior PROSPER pigment-based inks from Kodak) contain a relatively high solids content (pigments), humectants (e.g., glycerol), dyes, and slow evaporating solvents (e.g., TEA (triethanolamine), ethylene glycol). It was surprisingly found that the combination of these particular ink constituents were problematic when run at higher press speeds. At speeds in excess of 900 ft/min, the inks would not dry sufficiently and would track off and build up on the processing rollers, and the resulting tickets routinely failed the wet chemistry security tests. The high solids content of these inks was found to particularly undesirable because of increased wear/abrasion of the print heads, increased jet orifice dry-in/clogging, longer downtime to refurbish/clean, and instability.

The present inventors determined that a low solids content dye-based ink could be used to achieve satisfactory high-speed printing, drying, immobilization and setting of the dye components in order to prevent dye migration and produce secure lottery tickets that pass the requisite security tests. In particular, it was determined that removal of the pigments, humectants, and slow-evaporating solvents, as well as the addition of a water resistant polymer additive, results in a particularly useful ink for high speed (greater than 900 ft/min), high resolution (at least 600 dpi) printing of scratch-off lottery tickets. It addition to the ink formulation, it was found that a modification to the conventional primer layer on the paper substrate added to the success of the printing process. Specifically, this primer modification involved addition of sizing additives, opaque polymers, and surfactants for specific contact angle requirements.

Accordingly, the present invention provides a method for producing scratch-off lottery tickets in a high speed printing line, wherein the printing line includes one or more inkjet printing machines that print the lottery tickets on a continuously running paper stock. The method includes applying one or more primer layers to a surface of the paper stock at least in a defined game play area on each lottery ticket. With one or more of the inkjet printing machines in the printing line, game play indicia is printed over the primer layers in the game play area on each lottery ticket at a resolution of at least 600 dpi as the running paper stock is conveyed through the printing machines at a rate of at least 950 ft./min. An upper blocking (security) layer is applied over the over the game play indicia, and graphics are printed on each lottery ticket outwardly of the game play area.

The method includes using specially formulated ink in the inkjet printing machines to print the game play indicia at the 600 dpi resolution and conveying rate of at least 950 ft./min. This ink comprises: a solids content of no more than 10.00% by weight; a humectant content of more than 1.00% by weight; a slow-evaporating solvent content of no more than 1.00% by weight; a fast-evaporating solvent content of at least 1.00% by weight; and a water resistant polymer content of at least 5.00% by weight.

In a particular embodiment, the running paper stock is conveyed through the one or more inkjet printing machines that print the game play indicia at a rate of about 975 ft./min.

The method may include printing the graphics outwardly of the game play area by one or more inkjet printing machines at a resolution of at least 600 dpi and at a rate of at least 950 ft./min. In addition, the method may include printing graphics over the SOC layer also at a resolution of at least 600 dpi and at a rate of at least 950 ft./min.

Certain embodiments of the method may include applying the primer layer that on which the game play indicia is printed, wherein the primer material comprises: a plastics pigment content of 15.0 to 25.0% by weight; an opaque polymer content of 8.0 to 15.0% by weight; a hydrophilic silica content of 0.50 to 1.50% by weight; a resolubility additive content of 5.0 to 15% by weight; a plasticizer content of 2.0 to 6.0% by weight; and a surfactant content of 1.0 to 3.0% by weight.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 2:
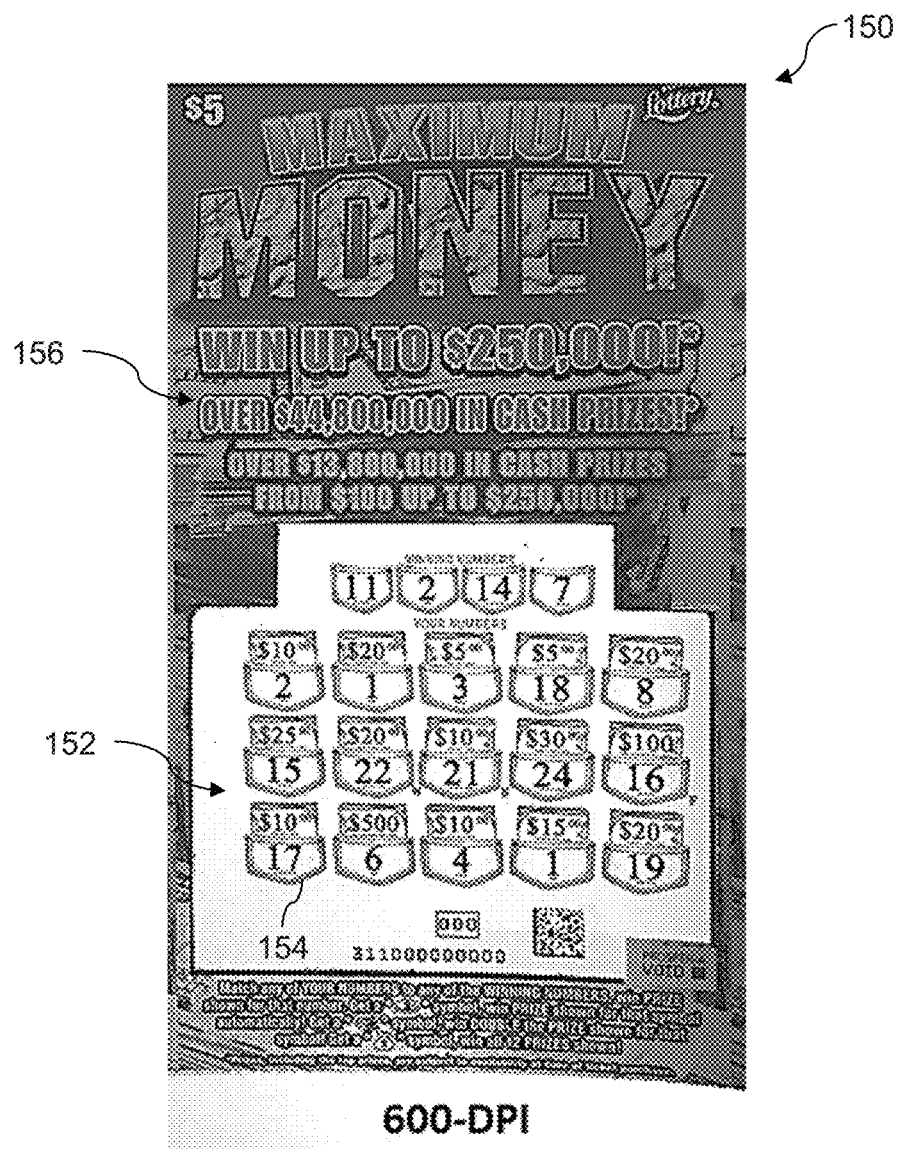
FIG. 2 is a front view of a scratch-off lottery ticket made in accordance with the present method.

FIG. 2 depicts an exemplary scratch-off lottery ticket 150 that includes a game play area 152 in which the game play indicia 154 is printed. Any manner of graphics (color or non-color) 156 may be printed on the ticket 150 outward of the game play area 152. Scratch-off lottery tickets are well-known in the art and need not be described in detail herein. Generally, a lottery game embodied on the ticket 150 has a theme that is displayed and explained by the graphics 156. The graphics 156 may include any combination of artwork, indicia, and the like, that convey to a player the theme, rules, and possible prize of the game. The graphics 156 are not a limiting feature, and what the actual graphics 156 in FIG. 2 may or may not say it is not relevant to an understanding of the present invention.

FIG. 2 depicts the ticket 150 after removal of a scratch-off coating (SOC) from the game play area 152 to reveal the underlying game play indicia 154, which reveals the outcome of the game. With conventional tickets, this game play indicia was typically printed at a resolution of about 240 dpi, which resulted in a less than crisp or sharp image, particularly with game indicia incorporating any sort of graphics beyond the basic letter or number fonts. Common complaints from players often included the "blurry" or "dull" appearance of the game play indicia 154. The game indicia 154 depicted in FIG. 2 is printed at a resolution of 600 dpi, as explained more fully below. This enhanced resolution provides the opportunity to greatly enhance the appearance and detail of the game play indicia 154.

Figure 1:
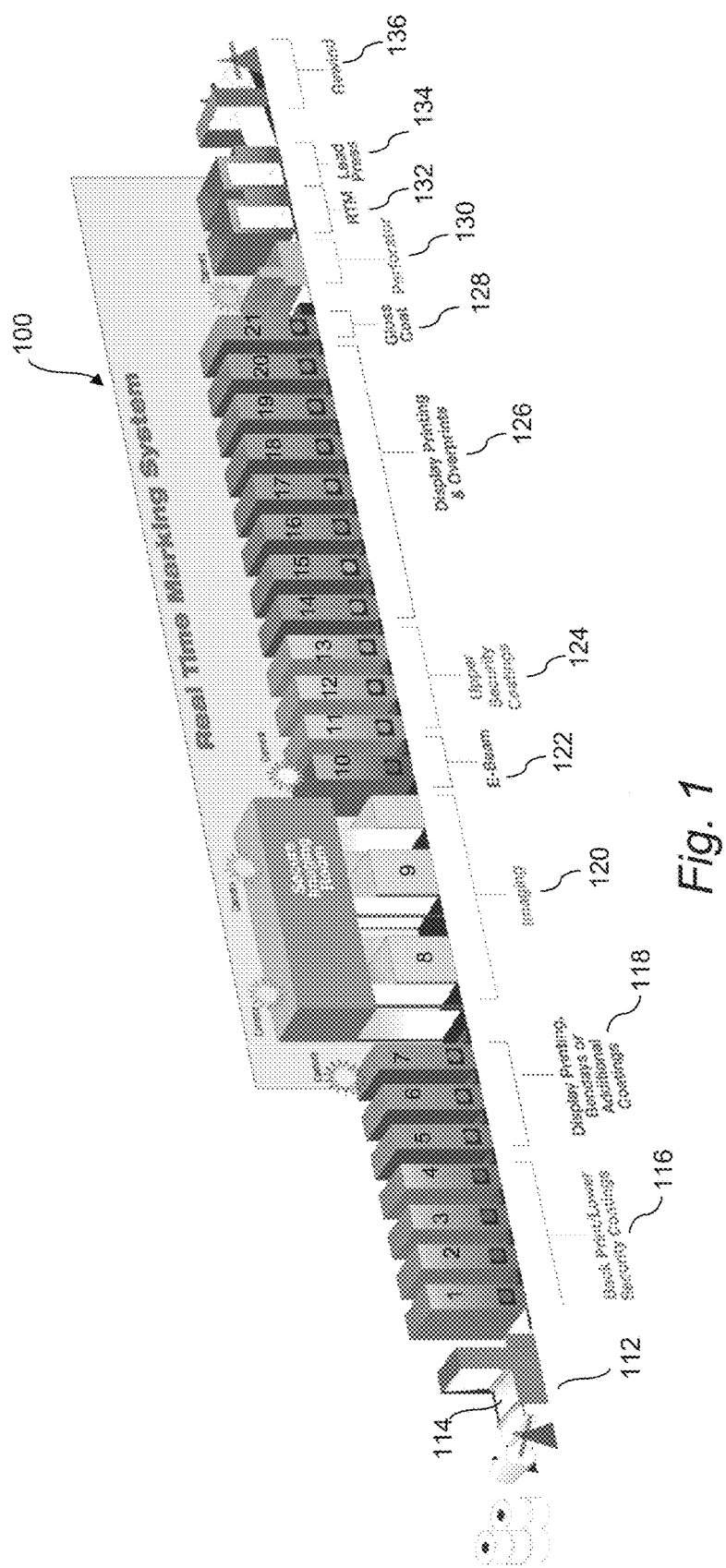
FIG. 1 is an operational diagram of a lottery ticket production line that incorporates aspects of the present methodology.

FIG. 1 depicts an exemplary high-speed print production line 10 for manufacturing instant scratch-off lottery tickets in accordance with aspects of the present invention. This particular print line 10 is presented for illustrative purposes only. It should be appreciated that the present method embodiments are not limited to any particular print line configuration.

Figure 3:
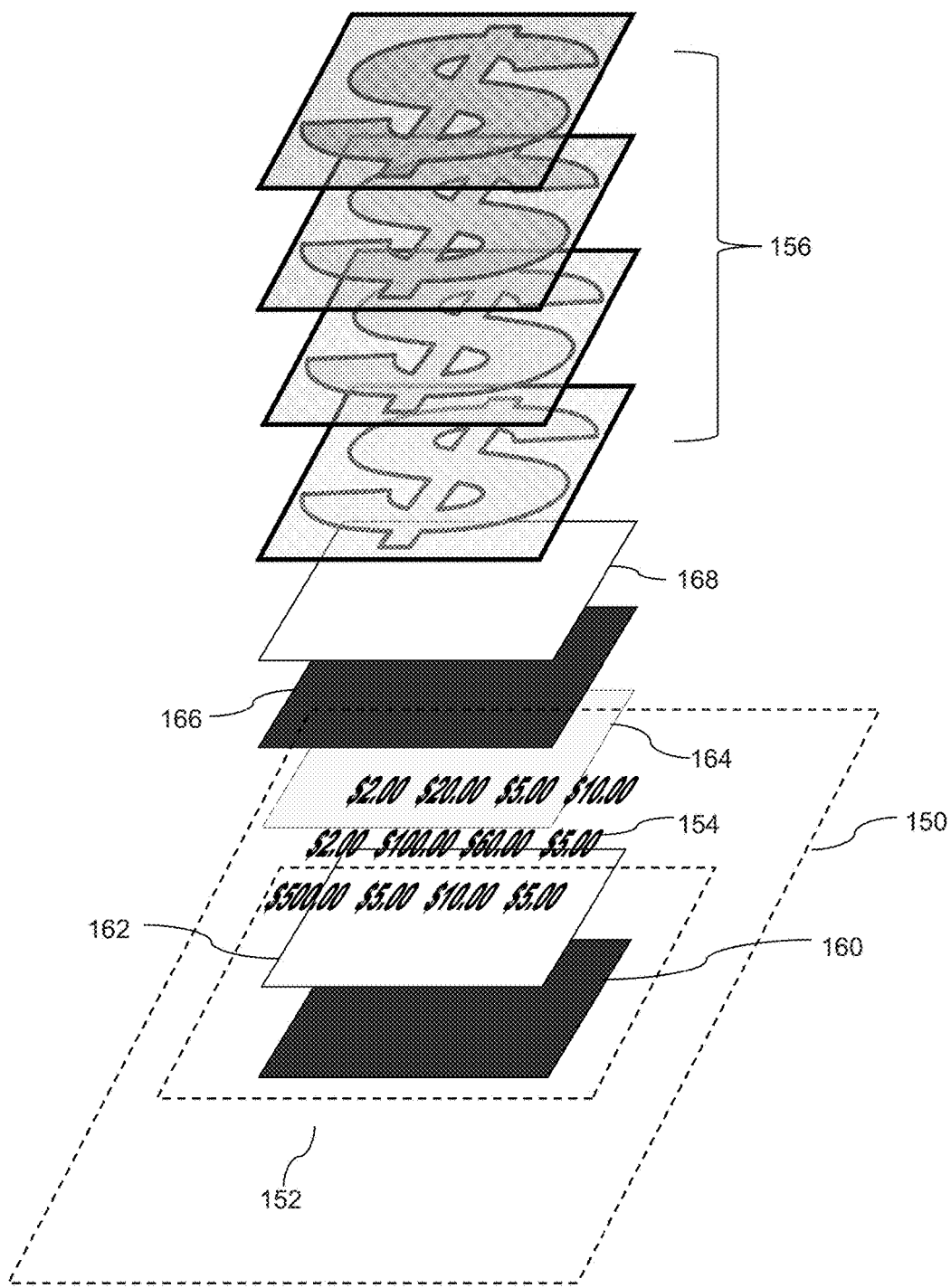
FIG. 3 is layer view of the game play area of an exemplary scratch-off lottery ticket made in accordance with the present method.

Referring to FIG. 1 and the layer view of FIG. 3 of a game play area 152, a paper stock substrate 114 on which the lottery tickets are to be printed is delivered to an unwind station 112, typically in the form of rolls, with the unwind station 112 including a suitable web tensioning device. The substrate 114 is then conveyed to a first printing station 116 that includes one or more printing machines (labeled 1 through 4) for applying an initial primer security layer 160 in the form of a black opaque layer to the substrate 114 in the game play area 152. Any one or combination of the printing machines 1-4 may be used to apply this layer primer layer 160.

The substrate 114 is then conveyed to second printing station 118 that includes multiple printing machines 5-7 for printing a white or tinted primer layer 162 atop the black primer layer 160 (which also acts as a security layer). This layer is specially formulated for subsequent printing of the game play indicia 154 thereon, as described in greater detail below.

At least the white or tinted primer layer 162 is specially formulated to support the subsequent high speed/high resolution printing of the game play indicia. The initial primer layer 160 may also have the same composition. In particular, the primer coating material comprises:

- a plastics pigment content of 15.0 to 25.0% by weight (e.g., Hique™ 2050 plastic pigment dispersion);
- an opaque polymer content of 8.0 to 15.0% by weight (e.g., Joncryl™ 633 emulsion polymer);
- a hydrophilic silica content of 0.50 to 1.50% by weight (e.g., Aerosil™ 200 silica);
- a resolubility additive content of 5.0 to 15% by weight to aid the primer in re-wetting on the machine without drying-in on the applicator; (e.g., SMA™ 1440H solution)
- a plasticizer content of 2.0 to 6.0% by weight (e.g., benzoate ester);

a surfactant content of 1.0 to 3.0% by weight (e.g., octylphenol Ethoxylae—nonionic)

It should be appreciated that the primer coating material may components in addition to those listed above.

From the second printing station, the substrate 114 is then conveyed to a secure imaging station 120, which includes one or more inkjet printing machines 8-9 for printing the game play indicia 154 atop the primer layer 162 in the game play area 152. Suitable printing machines 8-9 for this purpose are commercially available from Kodak under the PROSPER S-series line. A specially formulated ink is used in the inkjet printing machines 8-9 to print the game play indicia on each ticket at a 600 dpi resolution and conveyance rate of the substrate 114 of at least 950 ft./min. Suitable inks for this purpose have been specially formulated for the Assignee (Scientific Games International, Inc.) of this patent application by Kodak as the PROSPER S-series part #6080040 Spot Black ink. In general, suitable inks include have the following characteristics:

- a solids content of no more than 10.00% by weight (determined by gravimetric solids technique);
- a humectant content of at least 1.00% by weight (e.g., sodium hydroxide and dimethylaminoethanol (DMAE), 0.5% each by weight);
- a slow-evaporating solvent content of no more than 1.00% by weight (e.g., benzyl alcohol) (a slow-evaporating solvent for the present purposes evaporates slower than water, which has an evaporation rate of 0.3600 as compared to the reference standard evaporation rate of 1.000 for n-butyl acetate);
- a fast-evaporating solvent content of at least 1.00% by weight (e.g., additional DMAE—evaporation rate of 0.4800);
- a water resistant polymer content of at least 5.00% by weight (e.g., Eastek™ 1400 polymer dispersion).

From the secure imaging station 120, the running stock 114 is conveyed through an "E-Beam" clear coating station 122 wherein a protective, energy curable coating 164 is applied by machine 10 over the game play indicia 154 in the game play area 152. This coating 164 also serves as a release layer that facilitates removal of the subsequently applied upper blocking layer 166 and scratch-off material layer 168.

The running substrate 114 is then conveyed through a security coatings station 124 wherein the printing machines 11-13 apply the upper blocking security layer 166 (e.g., a black blocking layer) atop the release layer 164 and over the game play indicia 154. The machines also apply the scratch-off coating layer 168 atop the upper blocking layer 166.

The substrate 14 is then conveyed through an additional printing station 26 wherein a combination of printing machines 14 through 20 are used to print the game graphics 156 outward of the game play area 152, as discussed above. In addition graphics 156 may be printed over the scratch-off coating layer 168, as depicted in FIG. 3. Printing machines 14 through 20 may also be inkjet printing machines configured as described above for printing multi-colored graphics at a 600 dpi resolution and at a conveying rate of the substrate 114 of at least 950 ft./min.

The running substrate 114 is then conveyed through an application machine 30 that applies a gloss coat over the entire lottery ticket.

From the gloss coat station 128, the substrate 114 is conveyed through a perforation station 130 wherein a perforating machine defines perforation lines in the substrate 114 transverse to the longitudinal travelling direction of the substrate 114. As is well understood, the perforation line defines a separation line between adjacent ends of interconnected tickets.

The perforated running substrate 114 is then conveyed through an RTM ("Real Time Marking") station 132 where press personnel watch/inspect the web substrate while printing for quality control issues.

The substrate 114 is then conveyed through a "Lead Press" station 134, which includes the main press console. This is the station where a "lead press operator" essentially controls the entire press operation.

Finally, the substrate 114 is brought to a rewind station 136 wherein the perforated substrate 114 with multiple rows of lottery tickets printed thereon is wound back into a roll package.

It should be appreciated that, desirably, the running paper substrate 114 is conveyed through the entirety of the production line 100 at the conveyance rate of at least 950 ft./min.

From the rewind station 136, the ticket rolls are eventually transported to additional processing stations wherein the substrate 114 is unwound and conveyed through a slitter for separating the individual rows of interconnected and perforated tickets. The individual rows of tickets are then conveyed through a folding station wherein the tickets are folded in a Z-pattern into individual packs prior to being wrapped and sealed.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. Scratch-off lottery tickets that are ink-jet printed in a high speed printing line on a continuously running paper stock, each lottery ticket comprising:
   a base paper stock layer;
   one or more primer layers applied to a surface of the paper stock layer in a defined game play area on the lottery ticket;
   game play indicia ink-jet printed over the primer layers in the game play area, the game play indicia having a resolution of at least 600 dpi;
   an upper blocking layer applied over the game play indicia;
   a scratch off coating (SOC) layer applied over the upper blocking layer;
   graphics printed on the lottery ticket outwardly of the game play area;
   wherein an ink forming the game play indicia comprises an initial composition of:
      a solids content of no more than 10.00% by weight;
      a humectant content of more than 1.00% by weight;
      a slow-evaporating solvent content of no more than 1.00% by weight;
      a fast-evaporating solvent content of at least 1.00% by weight; and
      a water resistant polymer content of at least 5.00% by weight; and
   wherein the primer layer on which the game play indicia is printed comprises an initial composition of:
      a plastics pigment content of 15.0 to 25.0% by weight;
      an opaque polymer content of 8.0 to 15.0% by weight;
      a hydrophilic silica content of 0.50 to 1.50% by weight;

a resolubility additive content of 5.0 to 15% by weight;
a plasticizer content of 2.0 to 6.0% by weight; and
a surfactant content of 1.0 to 3.0% by weight.

2. The scratch-off lottery tickets as in claim 1, further comprising graphics printed over the SOC layer at a resolution of at least 600 dpi.

3. The scratch-off lottery tickets as in claim 1, wherein the humectant content comprises sodium hydroxide and dimethylaminoethanol in equal amounts by weight.

4. The scratch-off lottery tickets as in claim 1, wherein the slow evaporating solvent is benzyl alcohol.

5. The scratch-off lottery tickets as in claim 1, wherein the fast-evaporating solvent is dimethylaminoethanol.

6. Scratch-off lottery tickets that are ink-jet printed in a high speed printing line on a continuously running paper stock, each lottery ticket comprising:
a base paper stock layer;
one or more primer layers applied to a surface of the paper stock layer in a defined game play area on the lottery ticket,
game play indicia ink-jet printed over the primer layers in the game play area, the game play indicia having a resolution of at least 600 dpi;
an upper blocking layer applied over the game play indicia;
a scratch off coating (SOC) layer applied over the upper blocking layer;
graphics printed on the lottery ticket outwardly of the game play area;
wherein an ink forming the game play indicia comprises an initial composition of:
a solids content of no more than 10.00% by weight;
a humectant content of more than 1.00% by weight;
a slow-evaporating solvent content of no more than 1.00% by weight;
a fast-evaporating solvent content of at least 1.00% by weight; and
a water resistant polymer content of at least 5.00% by weight; and
wherein the humectant content comprises sodium hydroxide and dimethylaminoethanol in about equal amounts by weight.

7. The scratch-off lottery tickets as in claim 6, further comprising graphics printed over the SOC layer at a resolution of at least 600 dpi.

8. The scratch-off lottery tickets as in claim 6, wherein the slow evaporating solvent is benzyl alcohol.

9. The scratch-off lottery tickets as in claim 6, wherein the fast-evaporating solvent is dimethylaminoethanol.

10. The scratch-off lottery tickets as in claim 6, wherein the primer layer on which the game play indicia is printed comprises an initial composition of:
a plastics pigment content of 15.0 to 25.0% by weight;
an opaque polymer content of 8.0 to 15.0% by weight;
a hydrophilic silica content of 0.50 to 1.50% by weight;
a resolubility additive content of 5.0 to 15% by weight;
a plasticizer content of 2.0 to 6.0% by weight; and
a surfactant content of 1.0 to 3.0% by weight.

11. Scratch-off lottery tickets that are ink-jet printed in a high speed printing line on a continuously running paper stock, each lottery ticket comprising:
a base paper stock layer;
one or more primer layers applied to a surface of the paper stock layer in a defined game play area on the lottery ticket,
game play indicia ink-jet printed over the primer layers in the game play area, the game play indicia having a resolution of at least 600 dpi;
an upper blocking layer applied over the game play indicia;
a scratch off coating (SOC) layer applied over the upper blocking layer;
graphics printed on the lottery ticket outwardly of the game play area;
wherein an ink forming the game play indicia comprises an initial composition of:
a solids content of no more than 10.00% by weight;
a humectant content of more than 1.00% by weight;
a slow-evaporating solvent content of no more than 1.00% by weight;
a fast-evaporating solvent content of at least 1.00% by weight;
a water resistant polymer content of at least 5.00% by weight; and
wherein the slow evaporating solvent is benzyl alcohol.

12. The scratch-off lottery tickets as in claim 11, further comprising graphics printed over the SOC layer at a resolution of at least 600 dpi.

13. The scratch-off lottery tickets as in claim 11, wherein the fast-evaporating solvent is dimethylaminoethanol.

14. The scratch-off lottery tickets as in claim 11, wherein the humectant content comprises sodium hydroxide and dimethylaminoethanol in equal amounts by weight.

* * * * *